(12) United States Patent
Chen et al.

(10) Patent No.: US 7,333,418 B2
(45) Date of Patent: Feb. 19, 2008

(54) SHAPE-LIMITLESS OPTICAL MEDIA

(75) Inventors: Hua-Chieh Chen, Hsinchu County (TW); Chin-Chang Lin, Hsinchu (TW)

(73) Assignee: Gigastorage Corporation, Hsin Chu (TW)

( * ) Notice: Subject to any disclaimer, the term of this patent is extended or adjusted under 35 U.S.C. 154(b) by 191 days.

(21) Appl. No.: 11/222,856

(22) Filed: Sep. 12, 2005

(65) Prior Publication Data
US 2006/0274636 A1    Dec. 7, 2006

(30) Foreign Application Priority Data
Jun. 3, 2005   (TW) ............................... 94209334 U

(51) Int. Cl.
*G11B 7/00*    (2006.01)

(52) U.S. Cl. ...................................... 369/283
(58) Field of Classification Search ..................... None
See application file for complete search history.

(56) References Cited

U.S. PATENT DOCUMENTS 5,942,165 A * 8/1999 Sabatini ..................... 264/1.33
6,902,111 B2 * 6/2005 Han et al. ................... 235/454

* cited by examiner

*Primary Examiner*—A. J. Heinz
*Assistant Examiner*—Mark Blouin
(74) *Attorney, Agent, or Firm*—Troxell Law Office, PLLC

(57) ABSTRACT

The present invention provides a optical media with no shape limitation and, by deposing a position mark in a recording layer and reflection layer, an encryption setup and a special shape can be obtained for more diversification in use.

7 Claims, 4 Drawing Sheets

SHAPE-LIMITLESS OPTICAL MEDIA

FIELD OF THE INVENTION

The present invention relates to a optical media; more particularly, relates to deposing a recording layer and reflection layer on a substrate, where the shape of the recording layer and reflection layer is coordinated with the shape of the substrate to obtain a optical media with no shape limitation; and where a position mark is set in the recording layer and reflection layer to contain an encryption setup for a security or to be used to obtain a special shape by a mold.

DESCRIPTION OF THE RELATED ARTS

A general optical media (figure not shown) comprises a substrate, a recording layer and reflection layer and a protection layer, whose shape is a circle and a position mark is set at the surrounding edge. Yet, its shape is limited with no further function.

Please refer to FIG. 4, which is a perspective view of a prior art. Another optical media of a prior art is deposed in a groove of a disc tray, comprising a substrate 31 having a flange 311 and a round substrate 32 having a recording layer and reflection layer 321 at the center of the substrate 31, where the external diameter of the flange 311 is coordinated with the internal diameter of the groove for positioning the optical media by contacting the external wall of the flange 311 with the internal wall of the groove. Although the basic functions for a optical media and the positioning function are obtained, the shape of the optical media is limited to a rectangle or a circle with no other function. So, the prior arts do not fulfill users' requests on actual use.

SUMMARY OF THE INVENTION

Therefore, the main purpose of the present invention is to provide a optical media with no shape limitation and, by setting a position mark in a recording layer and reflection layer, to obtain an encryption setup and a shape with no limitation.

Another purpose of the present invention is to provide an RFID (Radio Frequency IDentification) system in a substrate for a personal identification.

Still another purpose of the present invention is to depose a two-dimensional bar code, a bar code, an image, etc. to obtain functions of a personal identification and a stored value card.

To achieve the above purposes, the present invention is a shape-limitless optical media, comprising a substrate, a recording layer and reflection layer and a protection layer, where the substrate is a base of the optical media with no shape limitation; the recording layer and reflection layer is deposed on the substrate in a shape coordinated with the shape of the substrate; a position mark is set in the recording layer and reflection layer and a spacer is form by the outer edge of the recording layer and reflection layer; the protection layer is deposed on the recording layer and reflection layer; and, so, the optical media is obtained with no shape limitation and an encryption setup and a special shape by a mold can be obtained by the position mark. Accordingly, a novel shape-limitless optical media is obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is a perspective view of a first preferred embodiment according to the present invention;

DESCRIPTION OF THE PREFERRED EMBODIMENTS

The following descriptions of the preferred embodiments are provided to understand the features and the structures of the present invention.

Figure 1:
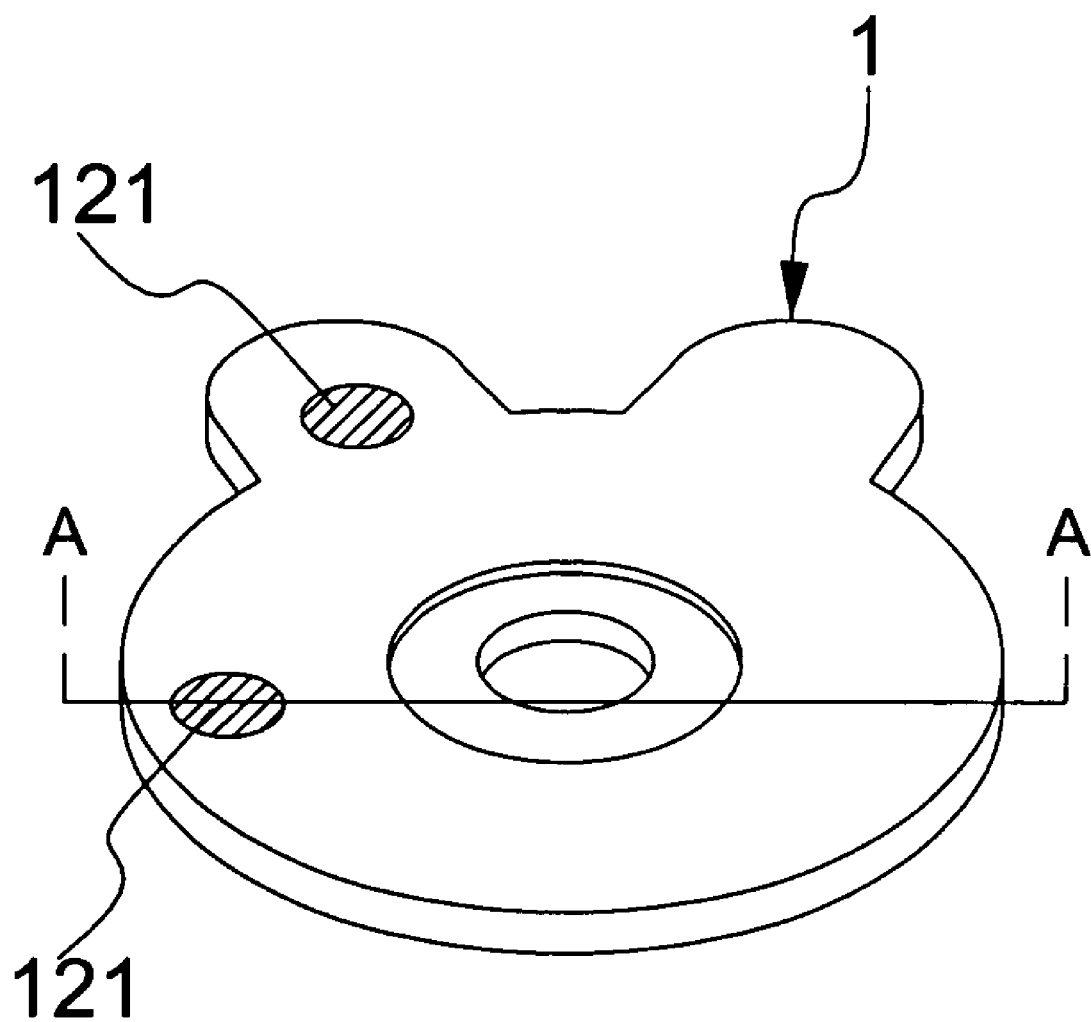
Figure 2:
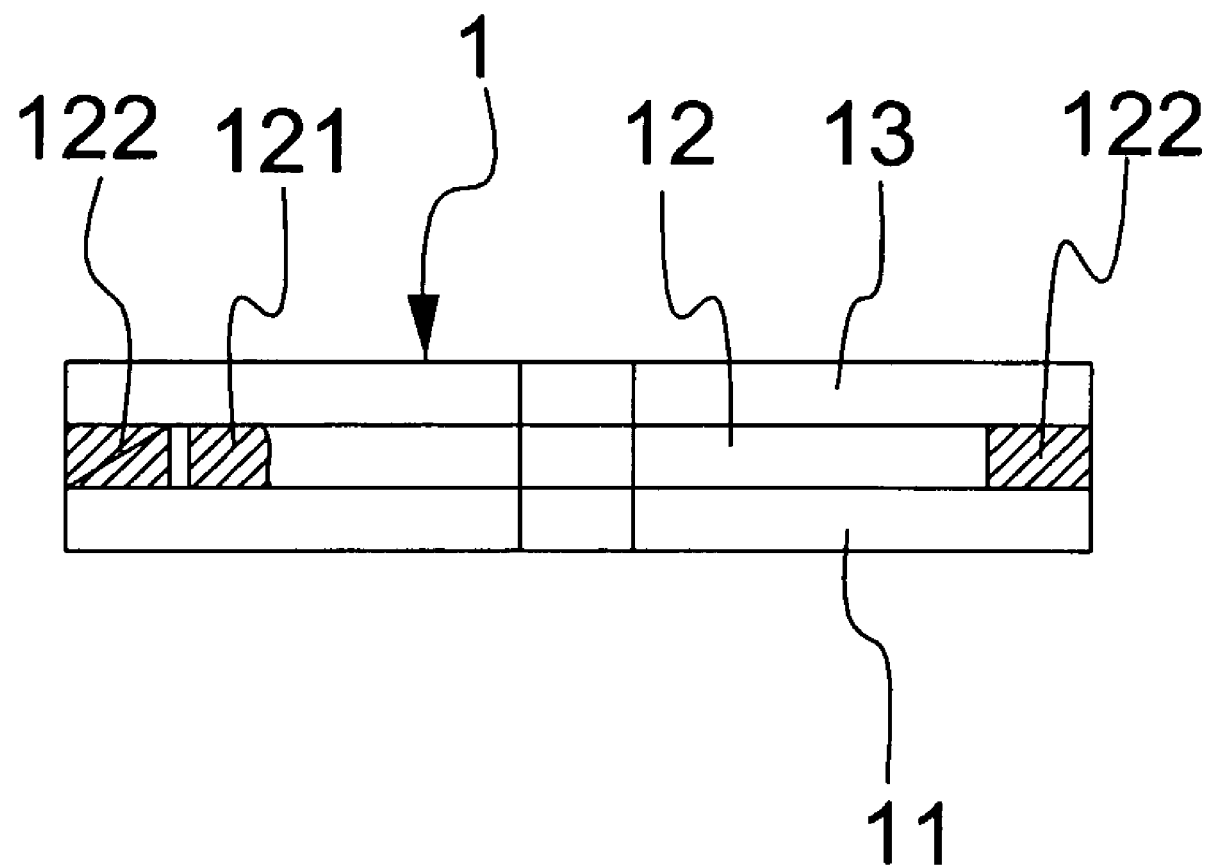
FIG. 2 is a cross-sectional view of A-A line in FIG. 1 according to the first preferred embodiment of the present invention.

Please refer to FIG. 1 and FIG. 2, which are a perspective view and a cross-sectional view of A-A line in FIG. 1 according to a first preferred embodiment of the present invention. As shown in the figures, the present invention is a shape-limitless optical media, comprising (a) a substrate 1 limitlessly shaped as a base of the optical media; (b) a recording layer and reflection layer 12 coordinated with the shape of the substrate 1 deposed on the substrate by a coating or a sputtering; and (c) a protection layer 13 deposed on the recording layer and reflection layer, where the recording layer and reflection layer comprises a position mark 121 to obtain an encryption setup or a special shape by a mold, and a spacer 122 formed by an outer edge of the recording layer and reflection layer 12; and the optical media comprises a thickness of 0.76 millimeter to fit in the requirements of ISO 7810, where a total thickness of the present invention is 1.5 millimeters. Hence, a novel shape-limitless optical media is obtained with the above structure.

The characteristics of the present invention is that the optical media 1 can be shaped with no limitation by deposing the recording layer and reflection layer 12 on the substrate 11 as tying in its shape with the shape of the substrate 11 whose shape is limitless; and the recording layer and reflection layer 12 comprises the position mark 121 which has an encrypted setup (e.g. a company name) or is obtained by a molding (e.g. letters, images, marks); the optical media 1 can be positioned at a certain place and be cut into a required shape by using the position mark 121; and, in addition, the position mark 121 can be further deposed out of an image to be cut, or, deposed in the image for an encryption. So, the security and the practicality of the present invention can be improved.

Figure 3:
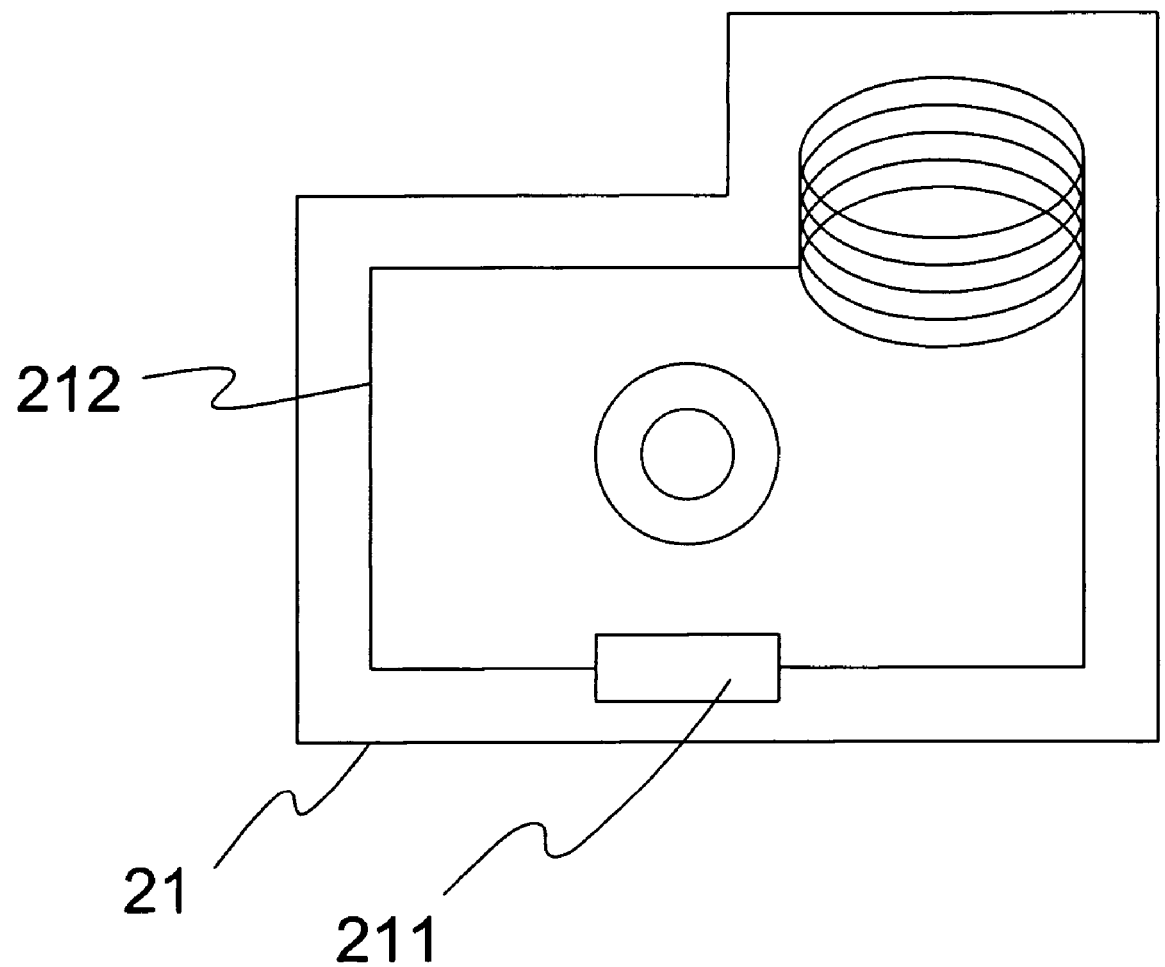
FIG. 3 is a view showing a status of use according to a second preferred embodiment of the present invention.
Figure 4:
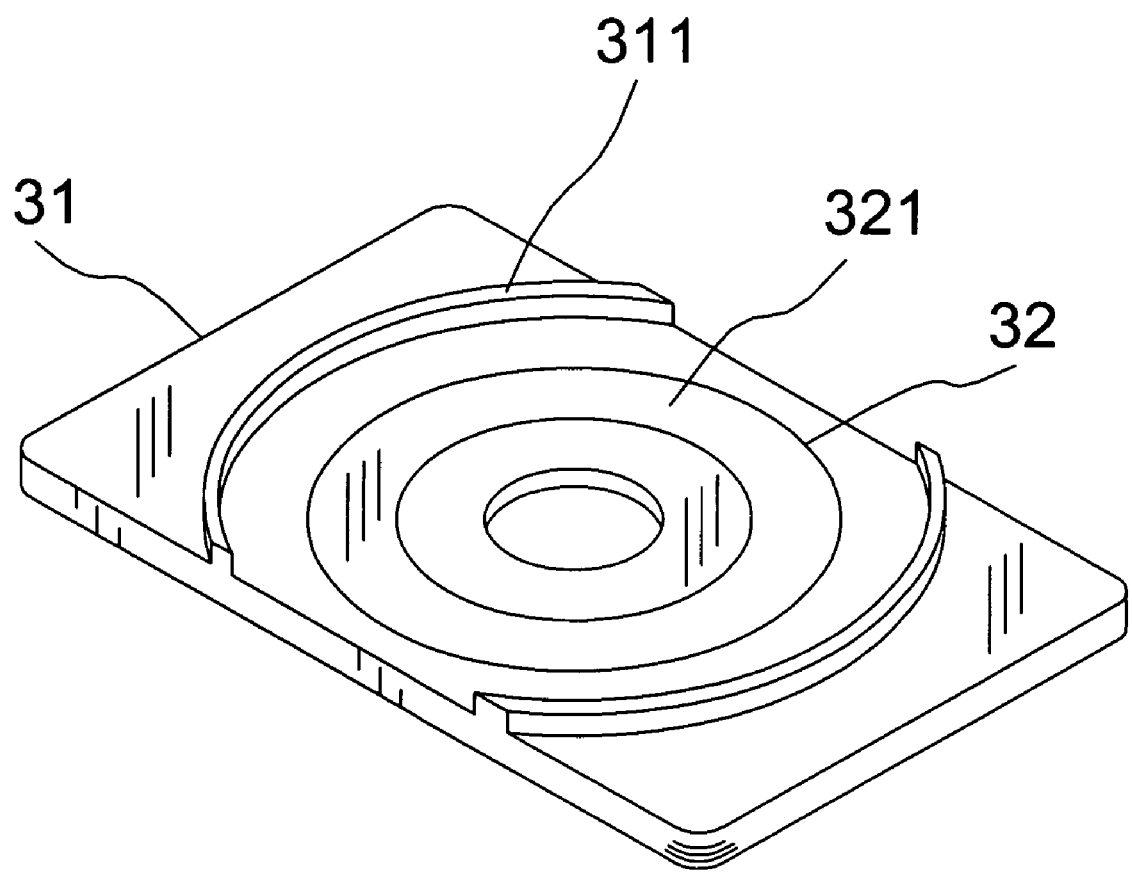
FIG. 4 is a perspective view of a prior art.

Please refer to FIG. 3, which is a view showing a status of use according to a second preferred embodiment of the present invention. As shown in the figure, an RFID (Radio Frequency IDentification) system can be set in the substrate 21 as a personal identification, where the RFID comprises a sensing device 211 and an antenna 212 in the substrate 21. Besides, a two-dimensional bar code, a bar code, an image, a hologram image, an lenticular image, etc. (not shown in the figure) can be deposed on a surface of the substrate so that functions of a personal identification and a stored value card can be obtained to greatly improve the security and practicality of the present invention.

The preferred embodiments) herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A shape-limitless optical media comprising:
   a) a substrate having a limitless shape and forming a base of the optical media;
   b) a recording layer and reflection layer located on the substrate and having a position mark and a spacer; and
   c) a protection layer located on the recording layer and reflection layer, each of the recording layer and reflection layer and the protection layer has a shape corresponding to the limitless shape of the substrate,
   wherein the spacer is located on an outer edge of the recording layer and reflection layer and engaging the substrate and the protection layer.

2. The shape-limitless optical media according to claim 1, wherein the position mark includes an encryption setup.

3. The shape-limitless optical media according to claim 1, wherein the position mark is deposed by a mold.

4. The shape-limitless optical media according to claim 1, wherein the optical media has a thickness of 0.76 millimeter.

5. The shape-limitless optical media according to claim 1, wherein the substrate includes a Radio Frequency Identification system.

6. The shape-limitless optical media according to claim 1, wherein the position mark extending through the recording layer and reflection layer and engaging the substrate and the protection layer.

7. The shape-limitless optical media according to claim 1, wherein a peripheral edge of the limitless shape of the substrate includes non-circular portions.

* * * * *